March 16, 1937.   A. J. DUANY ET AL   2,073,834
BARRIER CONTROL SYSTEM
Filed Feb. 17, 1936   5 Sheets-Sheet 1
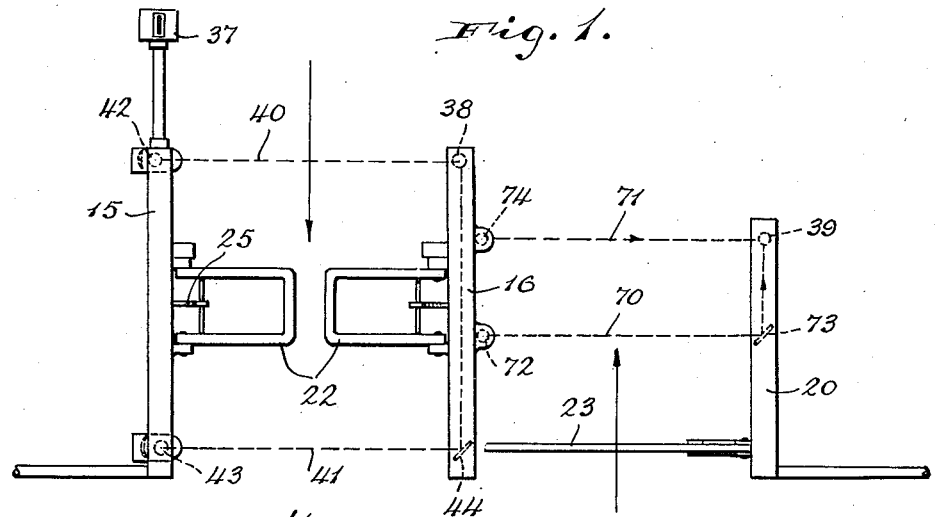
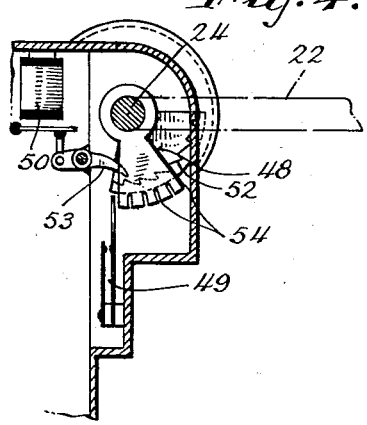
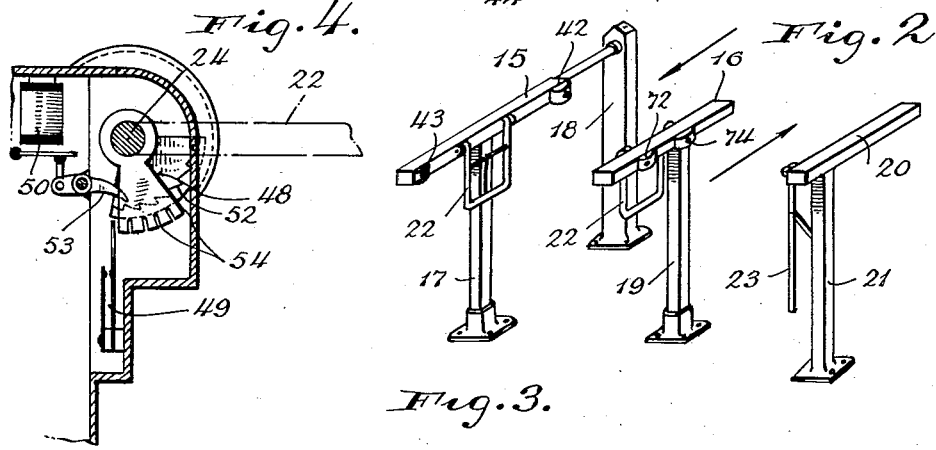
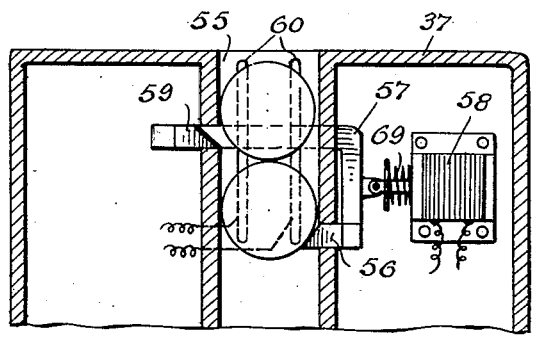
INVENTORS
ANDREW J. DUANY
HENRY THOMAS RANDALL
BY
ATTORNEYS

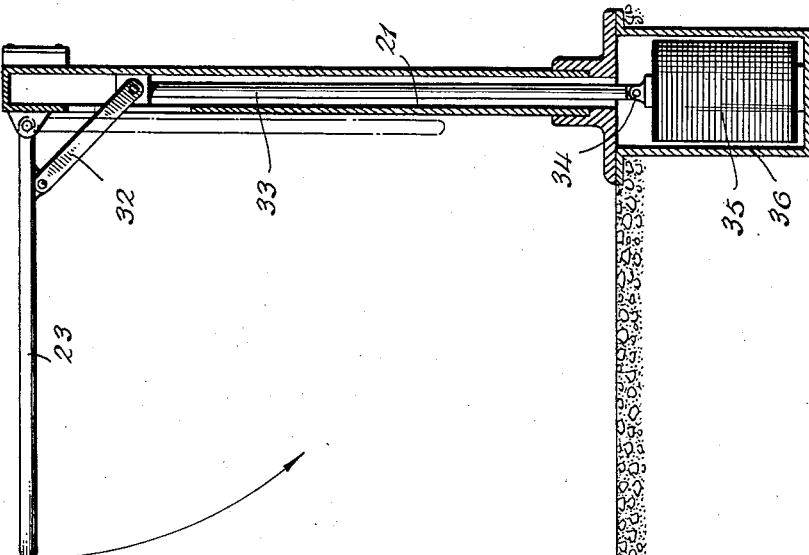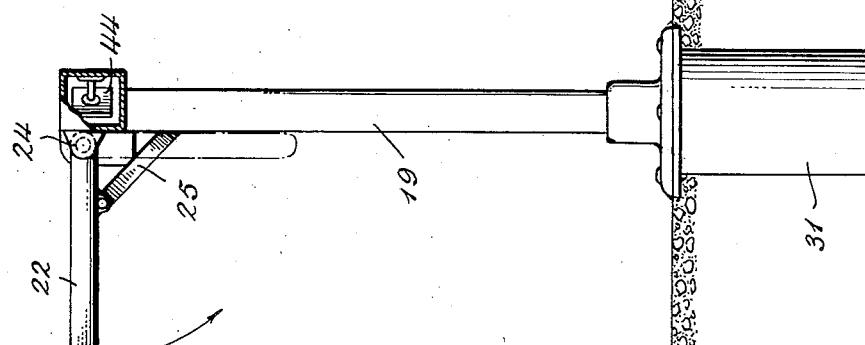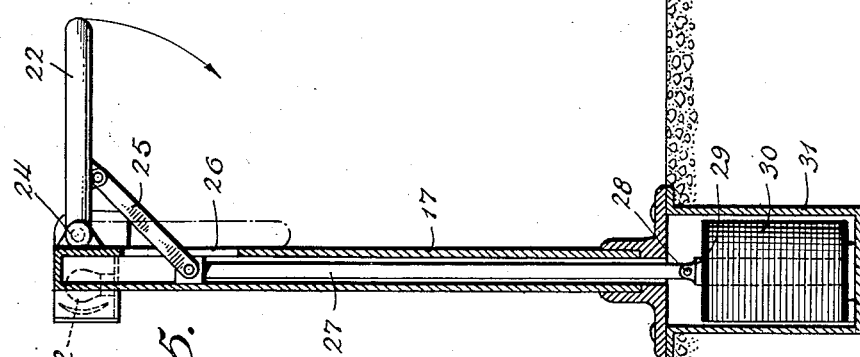

March 16, 1937.  A. J. DUANY ET AL  2,073,834
BARRIER CONTROL SYSTEM
Filed Feb. 17, 1936  5 Sheets-Sheet 4
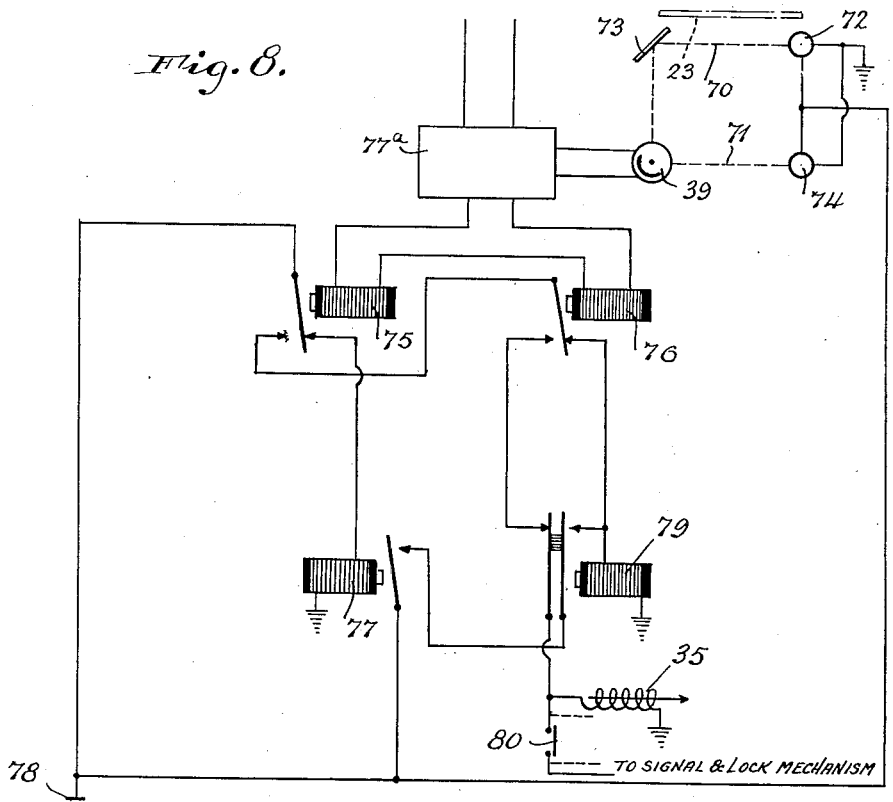
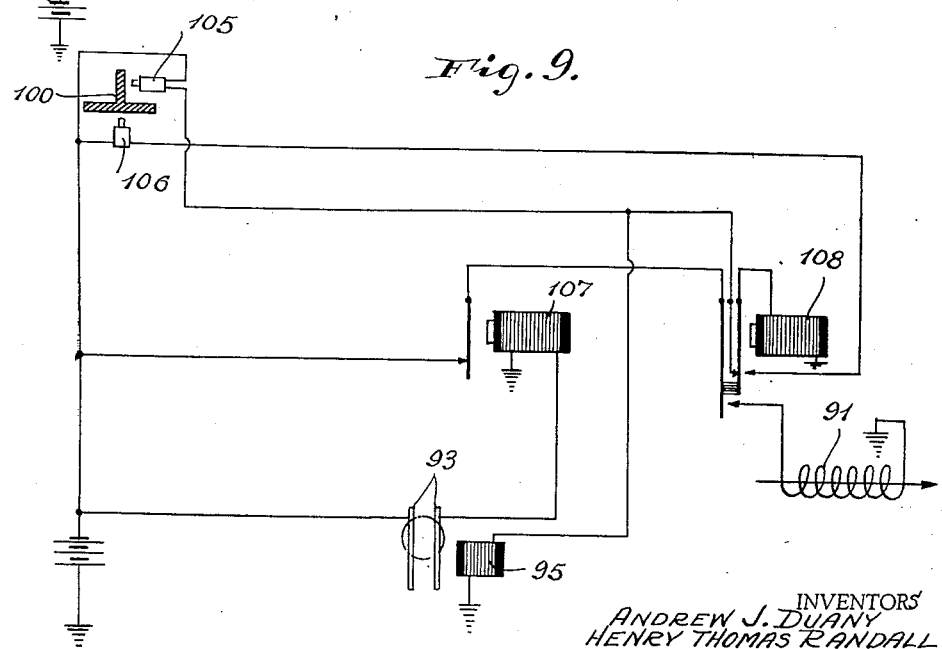
INVENTORS
ANDREW J. DUANY
HENRY THOMAS RANDALL
BY
Mueller & Ruhl
ATTORNEYS March 16, 1937.    A. J. DUANY ET AL    2,073,834
BARRIER CONTROL SYSTEM
Filed Feb. 17, 1936    5 Sheets-Sheet 5
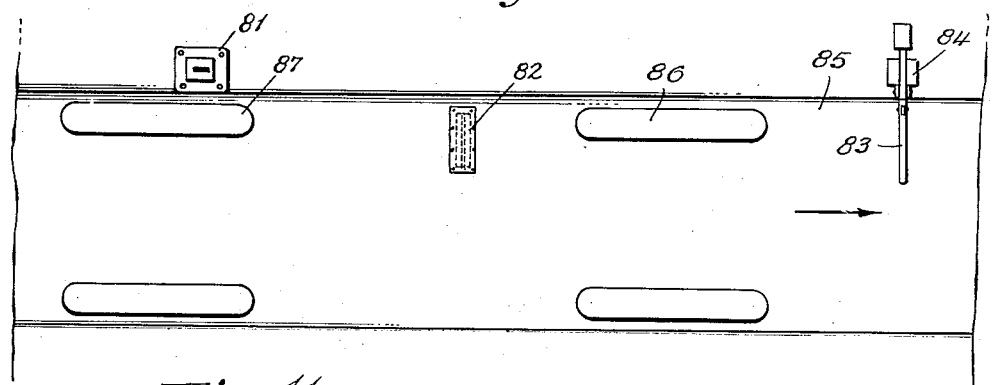
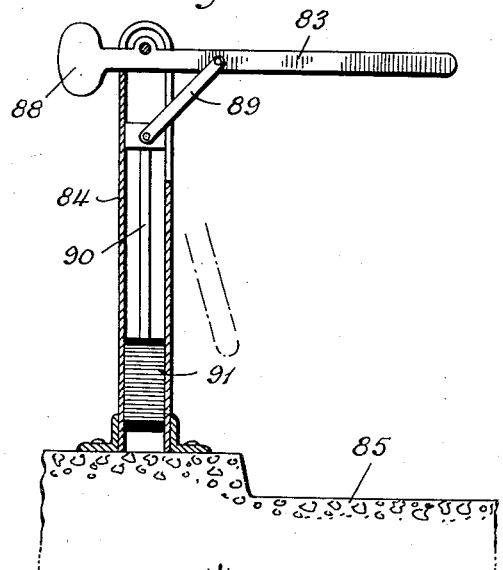
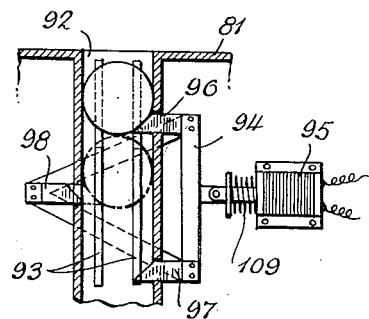
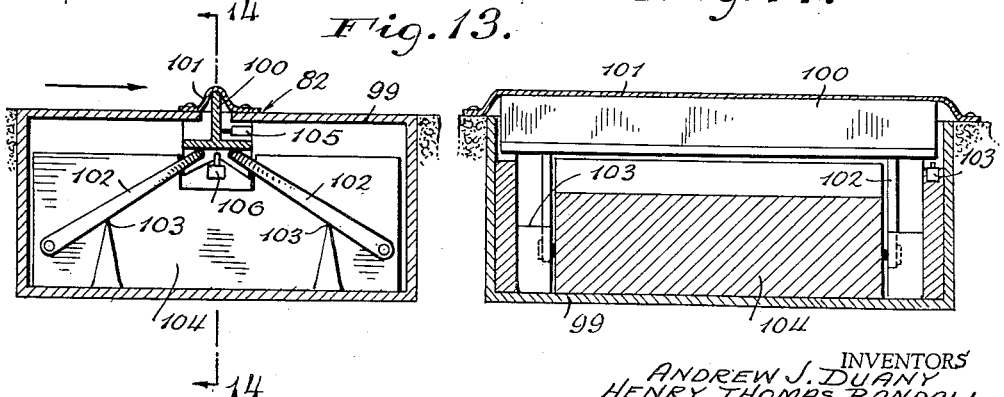
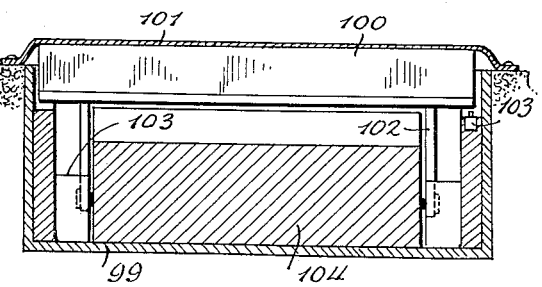
INVENTORS
ANDREW J. DUANY
HENRY THOMAS RANDALL
BY
ATTORNEYS Patented Mar. 16, 1937

2,073,834

UNITED STATES PATENT OFFICE 2,073,834

BARRIER CONTROL SYSTEM

Andrew J. Duany and Henry Thomas Randall, New York, N. Y.; said Randall assignor to said Duany Application February 17, 1936, Serial No. 64,245

15 Claims. (Cl. 194—6)

This invention relates to improvements in barrier control systems.

An object of the invention is to provide a simple and practical arrangement for installation at points, such as the entrances to public conveyances or assembly places, vehicle parking spaces and the like where toll charges are made for the privilege of entry, wherein said arrangement involves the use of a passageway having a barrier which is adapted to be closed to bar movement through said passageway should illegal entry be attempted, such illegal entry consisting in the failure to pay a toll charge and an accompanying attempt on the part of a person or other moving object to negotiate said passageway in a position wherein some portion of said person or object will pass a control means for the barrier at a height at least equal to the height of said means above the bottom of said passageway.

A further object is to dispose a light sensitive element and beams of light therefor in such relation to a barrier that the order of succession in which said beams are interrupted will determine the position of the barrier relative to the passage which it controls.

The above and other objects will appear more clearly from the following detailed description when taken in connection with the accompanying drawings which illustrate preferred embodiments of the inventive idea.

In the drawings:

Figure 1 is a plan view of entrance and exit barriers which may be used in such places as subways and on public conveyances or the like, said barriers being shown in closed positions.

Figure 2 is a perspective view of the arrangement shown in Figure 1, with the barriers in normally opened positions.

Figure 3 is a fragmentary sectional view through a coin control mechanism used in conjunction with the entrance barrier.

Figure 4 is a fragmentary sectional view of a barrier mounting with the barrier in closed position, and illustrating a locking mechanism therefor together with a circuit closing means associated therewith.

Figure 5 is a front elevation, partly in section, of an entrance barrier assembly with the barriers in operated position.

Figure 6 is a vertical sectional view through an exit barrier in its operated position.

Figure 8 is a similar view of a circuit controlling the exit barrier.

Figure 9 is a similar view of a circuit arrangement embodying the principles of the invention as applied to vehicles, this arrangement being adapted for use in parking spaces and the like.

Figure 10 is a plan view of the barrier arrangement embodied in Figure 9.

Figure 11 is a vertical longitudinal section through the vehicle barrier.

Figure 12 is a similar view through a coin control mechanism utilized in conjunction with the barrier of Figure 11.

Figure 13 is a transverse section through a road contact member and its associated elements, and Figure 14 is a section taken substantially on the line 14—14 of Figure 13.

Figure 7:
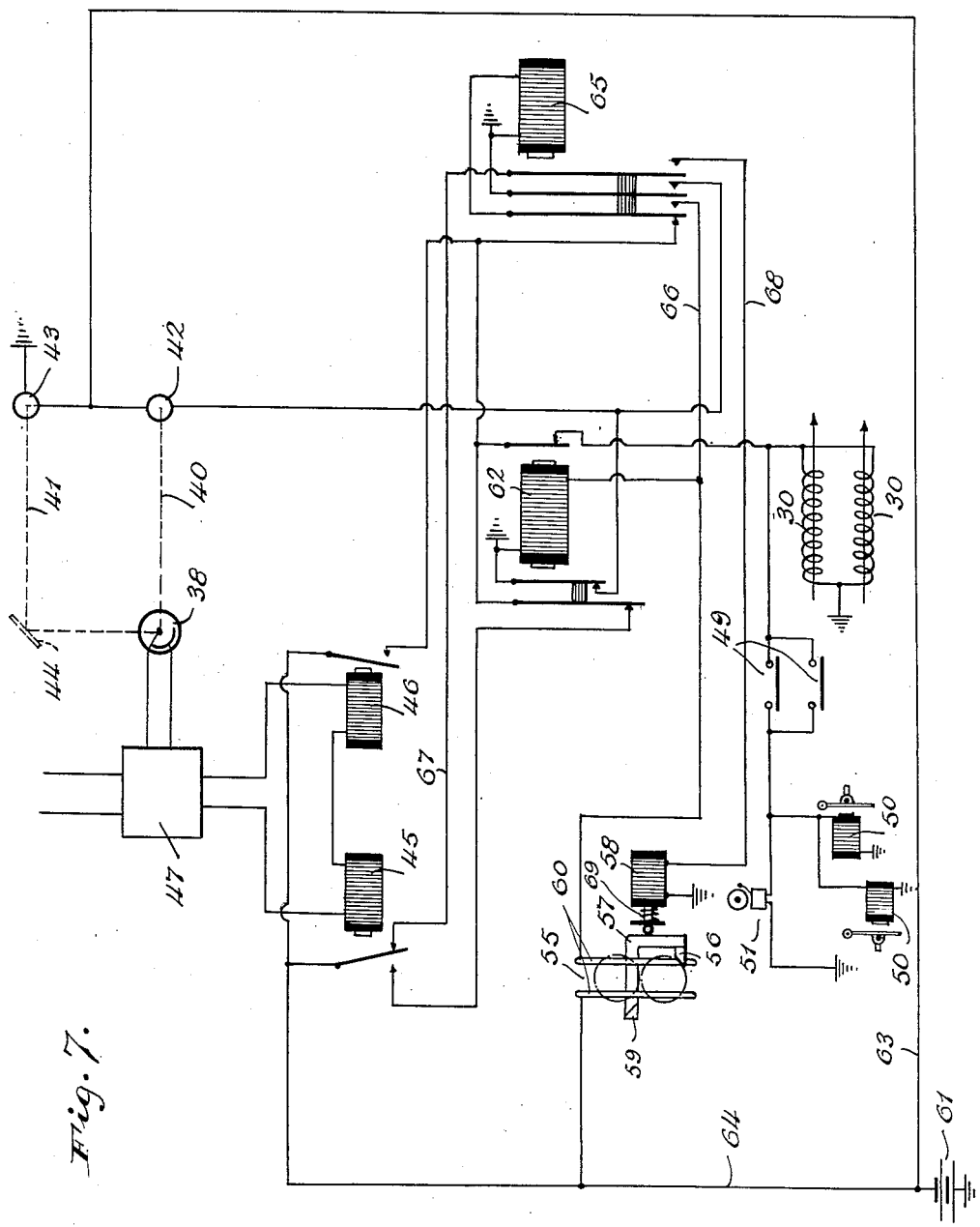
Figure 7 is a diagrammatic view of a circuit arrangement for controlling the entrance barrier.

Referring to Figures 1 and 2 an arrangement is shown in which entrance and exit barriers may be disposed contiguous to each other although it will be understood that this disposition need not necessarily be adhered to in carrying out the invention, since the two different barriers may be separated or two or more entrance or exit barriers may be grouped together. As shown, the passageway which is controlled by the entrance barrier is defined by the two horizontal rails 15 and 16 disposed in parallel relation and sufficient distance apart to conveniently permit the passage of a person, the rail 15 being supported by standards 17 and 18 while the rail 16 is mounted upon a standard 19. The rail 16 also combines with the rail 20 to define an adjacent exit passageway, said rail being supported by one or more standards 21. The barrier for the entrance passageway is shown as comprising two barrier members 22 of U-shaped construction hingedly connected to the rails 15 and 16 in opposed relation to each other and normally, in accordance with the preferred embodiment of the invention, in open or inoperative positions, in which they remain unless an illegal entry or an exit through the passageway is attempted. Likewise the exit passageway defined by the rails 16 and 20 is provided with a normally open barrier 23 hinged to the rail 20 adjacent the standard 21. This barrier 23 also remains in its open or inoperative position until such time when a person attempts to move through the exit passageway in the wrong direction. As shown in Figure 5 the left and right-hand barrier members 22 are hingedly connected at points 24 to the rails 15 and 16, respectively, for movements to horizontal and vertical positions. Each barrier member has pivoted thereto one end of a link 25 the other end of which is extended through a vertical slot 26 formed in the associated standard and pivotally connected to the upper end of a vertically movable rod 27 encased within the standard. The lower end of the operating rod 27 is pivoted at 28 to the core 29 of a solenoid 30 disposed within a casing 31 countersunk below the level of the passageway. With both barriers 22 in the normal open positions thereof, when their respective solenoids 30 are energized, as will appear in the course of the description, the consequent upward movement of the operating rods 27 will swing the barrier members, through the links 25 to their operative horizontal positions. Likewise, as shown in Figure 6, the exit barrier 23 is pivotally connected, through a link 32, to the upper end of an operating rod 33 enclosed within the standard 21, the lower end of said operating rod being pivoted at 34 to the core of a solenoid 35 disposed within the countersunk casing 36. When said solenoid is energized the operating rod 33 is forced upwardly to move the barrier from its normal open position to the horizontal operative position shown in full lines.

In accordance with the present invention, it is proposed to so control the entrance barrier that when legal entry is being made in the direction indicated by the arrow in Figure 1, a prerequisite of such entry being a deposit of a coin or token into the coin control mechanism supported upon the entrance end of the rail 15 and generally indicated by the numeral 37, the barrier members 22 will remain in their normal open positions so that the person entering may freely pass through the passageway. However, should the person fail to deposit the coin or token or should attempt to exit through the passageway, means are provided for energizing the two solenoids 30 of the barrier members 22 to adjust the same to their closing positions before the person can pass them. Similar means are also used in conjunction with the exit passageway which will be effective to energize the solenoid 35 to close the barrier 23 should a person attempt to pass through the passageway in a direction opposite to that indicated by the arrow in Figure 1. The control of the barriers 22 and 23 is effected, in accordance with the embodiment being described, by the utilization of light sensitive elements, such as photo-electric or selenium cells conventionally indicated at 38 and 39 and associated, respectively, with the entrance and exit passageways. In the case of the entrance passageway two beams of light 40 and 41 for the element 38 are arranged on the entrance and exit sides, respectively, of the barriers 22. A lamp 42 mounted upon the rail 15 is the source of the beam 40 which is directed across the entrance end of the passageway on to the element 38, while the lamp 43 also on the rail 15 forms the source for the beam 41 which is reflected through a mirror 44 on to the element 38. Associated with the light sensitive element 38 are a pair of relays 45 and 46 (Figure 7) and interposed in the circuit connecting the element 38 with said relays is an amplifier and rectifier circuit conventionally indicated at 47. This latter circuit may be of any well-known type including a vacuum tube and is capable of responding to alterations in the light intensity on the element 38 to control the operations of the relays 45 and 46. In the present arrangement of said circuit, said relays are normally energized and remain so as long as both beams 40 and 41 are directed on to the element 38. However, should either beam 40 or 41 be interrupted or extinguished, the change in light intensity causes an increase of the negative grid bias of the vacuum tube in said rectifier circuit, with a consequent decrease in the flow of plate current, resulting in the release of the relay 45. This decrease in current is not sufficient to de-energize the relay 46, but when the beam 41 is interrupted, following the extinguishment of the beam 40, consequent additional decrease in the plate current will cause the relay 46 to release. As will appear more clearly in the course of the description, when a coin or token is deposited in the mechanism 37 the beam 40 will immediately be extinguished and, as a consequence, the barrier members 22 will remain in their normal position, permitting the depositor of the coin to pass through the passageway without interference. On the other hand should a person fail to deposit a coin, the interruption of the beam 40 by the person attempting to pass the barrier members will immediately result in the operation of the latter to bar such passage. Likewise, should a person attempt to exit through the entrance passageway, that is, move in a direction opposite to the arrow indicated in Figure 1, the interruption of the light beam 41 will result in the movement of the barrier members to their closing positions.

Means are also provided in connection with an illegal entry or exit to lock the barrier members 22 in their closing positions and operate an audible signal should a person attempting such illegal entry or exit try to force the barrier members 22 downwardly toward their open positions. Such means is illustrated in Figure 4 in which one of the barrier members 22 is indicated in its operative position. Said locking and signalling means is under the control of a plate 48 associated with each barrier member and supported upon the pivot 24 of said member and movable therewith. Associated with each plate 48 is a pair of normally open contacts 49 the closure of which is designed to energize a relay 50 and an audible signal 51 (Figure 7). The barrier arm 22 is provided with a curved arm 52 having ratchet teeth with which is associated a pawl 53 under the control of the relay 50. When the latter is energized by the closure of the contacts 49 effected by engagement of the plate 48 therewith when an attempt is made to force the barrier 22 downwardly, the pawl 53 is actuated by the relay to assume the locking position in which it will engage one of the teeth 52 and prevent any further downward movement of the barrier. This locking action takes place, of course, only when an illegal attempt is made to pass the barriers by pressure thereagainst in the direction of their opening movement as it is only under such conditions that the relay 50 can be energized, as will appear in the course of the description. Should the person making the attempt to illegally pass the barriers retreat therefrom after they have been closed by the interruption of the light beam 40, and thereafter deposits a coin into the mechanism 37 the circuit for the relay 50 of each barrier will be opened at the relay 62 (Figure 7) as will hereinafter more specifically appear, and the barriers will be permitted to restore to their normal positions so that the person may then pass through. As each barrier member 22 is restored to its normal position the segmental portion of the plate 48 will wipe over the contacts 49 and, of course, close the same but at this time, as previously mentioned, the circuit for the relay 50 is opened and therefore no locking action upon the barrier member will take place. The edge of said segmental portion of the plate is provided therein with a plurality of slots 54 any one of which may receive the free end of the contact 49 engaged by said plate during the wiping action so that if the plate should come to rest, as in the locking action above described, the engaged contact may enter one of the slots and thus assume its normal flat position so that upon a reversal of the movement of the plate 48 said contact member will be permitted to flex in an opposite direction from that in which it is bowed when the plate 48 swings downwardly with the barrier member. It will also be observed from this construction that when the barrier member moves from its open toward its closed position the plate 48 will wipe over the contact 49 and flex the same so that it will not engage its associated contact.

The detailed operation of the entrance barriers 22 under various conditions will now be described and for this purpose particular reference is made to Figure 7. It will first be assumed that a person desiring to pass the barriers has deposited a coin or token into the coin slot or chute 55 of the mechanism 37. The coin moves downwardly in said chute by gravity until it rests upon the lower end 56 (Figure 3) of a detent 57 where said coin comes to rest and remains in this position until the person has passed the barrier members and cleared the light beam 41 at which time a solenoid 58 of the mechanism 33 is energized to retract the end 56 of the detent from the path of said coin, thus permitting the latter to fall into a coin box or other receptacle. When the detent 57 is thus operated the other end 59 thereof disposed on the opposite side of the chute 55 and normally positioned exteriorly thereof, is projected into said chute into the path of a second coin which may have been deposited by a person following the one who originally deposited a coin. When the first coin enters the chute 55 it electrically bridges two elongated contacts 60 to close a circuit extending from battery 61 through the two contacts 60 and the winding of relay 62 to ground. This relay then energizes and remains in such condition as long as there is a coin in the chute 55 to bridge said contact 60. The energization of relay 62 causes extinguishment of the lamp 42 the circuit for which extends from the battery 61 through the conductor 63, the lamp 42 and from thence through the inner left-hand back contact of the relay 62 to ground. The extinguishment of the lamp 42 alters the intensity of the light upon the photoelectric cell 38 and, as previously explained in connection with the amplifier and rectifier circuit 47, this alteration of light intensity will result in the release of the normally energized relay 45 with the result that battery is connected to the back contact thereof and also to the outer left-hand back contact of the relay 62. However, since this relay has previously been energized to open the latter contact, nothing occurs and the person will be permitted to pass the barrier members 22 in their open position. After passing said members, the person then interrupts the light beam 41 from the lamp 43 which is constantly illuminated by the circuit extending from the battery 61 through the conductor 63 and the lamp 43 to ground. The interruption of the beam 41 again reduces light intensity upon the photo-electric cell 38 with the result that the relay 46 de-energizes to close a circuit extending from battery 61, the conductor 64, the back contacts of relay 46 and 65 and the winding of the latter relay to ground. Relay 65 energizes and locks in a circuit extending from ground, the winding of said relay, the left-hand front contact thereof, the conductor 66, the contacts 60 bridged by the coin in the chute 55, and the conductor 64 to battery 61. The energization of the relay 65 again closes the circuit for the lamp 42 through the middle front contact of said relay to ground whereupon said lamp is lighted and the beam 40 is again directed upon the photoelectric cell. After the person has passed through or cleared the beam 41 so that it is no longer interrupted a condition exists in which both beams of light are now again directed upon the photo-electric cell and the relays 45 and 46 again energize. The energization of the relay 45 connects battery 61 to the front contact thereof and from thence through the conductor 67 to the right-hand front contact of relay 65 which is still locked and from thence through the conductor 68 to ground through the winding of the solenoid 58 of the coin control mechanism. Said solenoid energizes and withdraws the point 56 of the detent 57 from engagement with the deposited coin and the latter then falls into the coin box, breaking the electrical connection between the contacts 60 and thus opening the energized circuit of the relay 62 and the locking circuit of the relay 65. These relays then release and the circuit for the solenoid 58 is broken, whereupon the spring 69 becomes effective to restore the detent 57 to its normal position so that the point 56 will stop the next coin dropped into the chute. If it should happen that a second person deposits a coin in the chute 55 before the first person has cleared the light beam 41, the second coin would come to rest on top of the first coin, as shown in Figure 3, and when the detent is operated, as previously described, the point 59 would engage said second coin and retain it in the position just referred to while the first or lower coin was dropped into the coin box. Then upon the subsequent de-energization of the solenoid 58 and restoration of the detent 57, said second coin would be permitted to drop upon the point 56 and be retained in this position until the second person had cleared the light beam 41. Thus with one person immediately following another through the entrance passageway, and both having deposited coins, the circuit is not restored to normal as above described by the dropping of the first coin into the coin box because of the fact that the second coin is still in engagement with the contacts 60 and the energizing and locking circuits for the relays 62 and 65 are thus maintained until the second person has cleared the light beam 41.

It will now be assumed that an attempt is made to pass the barrier without depositing a coin in the mechanism 37. The light beam 40 is first interrupted causing release of the relay 45 in the same manner as when the lamp 42 was extinguished by the deposit of a coin into said mechanism and consequent energization of the relay 62. However, in the case of the attempted illegal passage, the relay 62 is not energized since the contacts 60 are not bridged by a coin and hence the release of relay 45 establishes a circuit from battery 61, conductor 64, back contact of relay 45, outer left-hand back contact of relay 62, right-hand back contact of said relay, and from thence to ground through the windings of the solenoids 30 associated with the two barrier members 22. Energization of these solenoids operates, in a manner previously described, to move the barrier members to their operative positions. In so doing the plate 48 of each barrier member flexes one of the contacts 49 away from the other until said plate has cleared the engaged contact. This operation of the contacts 49 has no effect upon either of the solenoids 50 of the two barrier members. However, should the person attempting the illegal entry persist in his efforts by trying to force the closed barrier members downwardly toward their open positions, the plate 48 of each member 22 will almost instantly close the contacts 49 whereupon a circuit for each of the relays 50 of the two barrier members will be established from ground through the windings of said relays, the contacts 49, the right-hand back contact of the relay 62, and the back contact of the relay 45 to battery. The relays 50 then energize to throw the pawls 53 into locking engagement with the ratchet teeth 52 on the two barrier members and thus lock the latter against any further downward movement. At the same time that the circuits are established for the relays 50 through the contacts 49, a circuit is also established to ground through the audible signal 51 which will continue until the contacts 49 are opened by the restoration of the barrier members to their closed positions. Should the person attempting the illegal entry then withdraw and permit the beam 40 to again reach the photo-electric cell the relay 45 will re-energize and thus break the circuit for the solenoids 30, permitting the barrier members to restore to normal position. On the other hand, should said person, instead of withdrawing, deposit a coin in the mechanism 37 the relay 62 will be energized through the previously described circuit therefor, and the energizing circuit for the solenoids 30 will thus be broken at the right-hand back contact of said relay, permitting the barrier members to restore to normal position so that the person may now pass the same.

Now, should a person attempt to exit through the entrance passageway, the light beam 41 will be first interrupted and as the relay 45 de-energizes upon interruption of either of the light beams, as previously described, the energizing circuit for the solenoids 30 will again be established and the barrier members 22 will be operated to bar the passage of the person attempting to go through the passage in the wrong direction. Then when the light beam 41 is again cast upon the mirror 44 by the withdrawl of such person the light intensity upon the photo-electric cell is increased to the normal condition and relay 45 again energizes to break the circuit for the solenoids 30 and the barrier members then restore to normal.

The control of the exit barrier 23 will now be described. As best shown in Figures 1 and 8, the light sensitive element 39 associated with the exit barrier is provided with two beams of light 70 and 71, the former having its source in the lamp 72 and being reflected on to the photo-electric cell by the mirror 73, while the beam 71 originates at the lamp 74 and is cast directly therefrom upon said photo-electric cell. As will be noted, both of the beams 70 and 71 are arranged on one side of the barrier 23 for a purpose which will appear in the course of the description. In conformity with the circuit arrangement and control of the barrier thereby, the light beam 71 is of greater intensity than the beam 70. As in the control circuit of Figure 7, the photo-electric cell 39 is electrically connected to a pair of relays 75 and 76 through an amplifier and rectifier circuit conventionally indicated at 77a. As long as both of the beams 70 and 71 are directed upon the photo-electric cell, the two relays 75 and 76 are energized. The circuit 77a is made responsive to alterations in the intensity of the light upon the photo-electric cell 39 in such manner that an interruption of either of the beams 70 or 71 will cause such a decrease in the plate current of said circuit that the relay 75 will release. With respect to relay 76, however, this relay remains energized if only the beam 71, the one of greater intensity, reaches the photo-electric cell; but if the latter receives light only from the beam 70, then the relay 76 will release. Under these conditions, when a normal exit is made in the direction of the arrow in Figure 1 the person is permitted to pass the barrier, which is then in its normal vertical position, before interrupting the light beam 70. When this occurs, the relay 75 de-energizes to break the normally closed circuit for the relay 77, which circuit extends through the front contact of relay 75 to battery 78. The closure of the back contact of relay 75 also establishes a circuit for the relay 79 extending from ground through the winding of said relay, the front contact of relay 76 and the back contact of relay 75 to battery, whereupon relay 79 energizes and is locked through a circuit extending from ground through its winding and front contact, the contact of relay 77 which is now released, and from thence to battery 78. Continued movement of the person through the exit passageway now results in the interruption of the light beam 71 and a consequent release of the relay 76. However, the closure of the back contact of this relay has no effect since the back contact of the relay 79, which is then locked in its energized condition, is open. When the person has completely cleared the beam 71 both beams are now again directed upon the photo-electric cell and the relays 75 and 76 again energize with the result that the relay 77 is energized through the front contact of relay 75, thus breaking the locking circuit for relay 79 and restoring the light circuit to its normal condition without having operated the barrier 23. Now assuming that a person should illegally attempt to pass the exit barrier by moving in a direction opposite to that indicated by the arrow in Figure 1, the light beam 71 is first interrupted as the person approaches the barrier. As previously explained the relay 75 releases upon interruption of either of the beams 70 or 71, while the relay 76 will release when the beam 71 is interrupted even though the beam 70 may, at the latter interruption, reach the photo-electric cell. Therefore upon the interruption of the beam 71 by the person attempting to illegally pass the exit barrier, both relays 75 and 76 will simultaneously release, the relay 77 will de-energize, but the relay 79 will not energize as during the normal exit previously described because of the fact that the front contact of the relay 76 is now open. Upon de-energization of the relays 75, 76 a circuit is established extending from battery 78 through the back contacts of relays 75, 76, and 79 and through the winding of the solenoid 35 to ground. This solenoid thereupon energizes and causes the barrier 23 to be raised to its operative position and thus bar further progress of the person through the exit passageway. A mechanism similar to that illustrated in Figure 4 may be associated with the exit barrier 23 and operates in the same manner as described in connection with the entrance barrier members so that if an attempt is made to force the barrier downwardly toward its open position a pair of contacts 80 (Figure 8), similar to the contacts 49, will effect the locking of the barrier and the operation of an audible signal. The person, finding that he cannot pass the barrier 23, will then withdraw in the direction of the arrow in Figure 1 and ultimately clear the light beams 70 and 71 with the result that the relays 75 and 76 will again energize and break the circuit for the solenoid 35 which thereupon restores the barrier to its normal position.

The vehicular barrier control system illustrated in Figures 9 to 14 will now be described. Figure 10 illustrates diagrammatically the apparatus employed in this embodiment of the invention, including the coin control mechanism 81, a road contact device 82 and a barrier 83 which is in a normally open position as shown in dotted lines in Figure 11 and pivotally mounted upon a standard 84 disposed along one side of a road bed 85 in which the device 82 is placed between the mechanism 81 and the barrier. In accordance with this embodiment, the deposit of a coin in the mechanism 81 and subsequent operations of the device 82 by the passage of the front and rear wheels 86 and 87 of a vehicle thereover will have no effect upon the barrier 83 and the vehicle will be permitted to pass the same. However should the device 82 be actuated without the deposit of a coin into the mechanism 81, means are provided for operating the barrier 83 to its closing position.

The barrier 83, which may have a counterweight 88 on one end thereof, is pivotally mounted upon the standard 84 and is connected by a link 89 to the upper end of an operating rod 90 the lower end of which is connected to the core of a solenoid 91, the connections being such that when the solenoid is energized the operating rod will move upwardly and thus raise the barrier to its closing position.

The mechanism 81 includes a coin chute 92 in which is disposed a pair of electrical contacts 93 adapted to be bridged by a coin in a manner similar to that described in connection with the contacts 60, and associated with said chute is a detent 94 controlled by a solenoid 95. In Figure 12 the detent is illustrated in its normal position and for the purpose of controlling the passage of the coins downwardly through the chute said detent includes the upper and lower coin-engaging portions 96 and 97 which project through the chute on one side thereof, and an intermediate portion 98 adapted to project through the opposite side of the chute in the operated position of the detent. In operation, when a coin is deposited into the chute it first rests upon the portion 96, as shown in full lines in Figure 12, until the road contact device 82 is operated by the front wheel 86 of the vehicle at which time the solenoid 95 is energized, as will later appear, thus withdrawing the portions 96 and 97 from the chute and projecting the portion 98 thereinto. This action permits the coin to drop until it engages the portion 98, as shown in dotted lines in Figure 12, where the coin is momentarily held until it is released by the de-energization of the solenoid 95 and subsequent restoration of the detent 94 to its normal position under the influence of the spring 109. The coin then drops onto the portion 97 where it is held until the rear wheel 87 of the vehicle operates the device 82 a second time to re-energize the solenoid 95. Thereupon, the detent operates to withdraw the portion 97 to release the coin which then falls into a coin box and, in so doing, disengages from the electrical contacts 93 which it bridged when it was first inserted into the coin chute. Bearing in mind that the detent 94 is only momentarily adjusted to its operated position with the portion 98 projecting into the chute to hold the coin at the time the front wheel 86 passes over the contact device 82, and that the immediate restoration of said detent permits said coin to drop onto the portion 97, should the driver of a following vehicle deposit a coin into the mechanism 81 before the rear wheel 87 had tripped the device a second time, the latter coin will be stopped by the portion 96 which at this moment is also projected into the path of the coin. Then when the rear wheel 87 of the first vehicle operates the device 82 and the solenoid 95 is again energized to release the first coin from engagement with the portion 97, the second coin will drop into the intermediate position where it is momentarily held by the portion 98 until the detent 94 restores to normal upon restoration of the device 82, whereupon said second coin falls onto the portion 97. The subsequent operation of the device 82 by the front wheel of the second vehicle then causes the operation of the detent 94 and release of said second coin into the coin box.

The device 82 comprises a housing 99 countersunk in the road bed 85 with the contact member 100 of said device disposed transversely to the path of travel of the vehicle. Said member 100 may be in the form of an inverted T-beam movably supported within the housing and having its web projecting above the surface of the rod 85 so that the wheels of the vehicle will contact the same. A flexible cover 101 may be secured over the projected portion of the member 100 for protective purposes. The member 100 is supported in the housing for co-ordinate rocking and downward movements which are occasioned by the passage of the wheels of the vehicle thereover. To thus support the member 100 two pairs of levers 102 fulcrumed at 103 have their upper ends connected to the member 100 while their lower ends are pivoted to opposite sides of a counter-weight 104 disposed within the housing 99. Thus when the member 100 is rocked and depressed by the passage of a vehicle wheel thereover the movements of said member rock the pairs of levers 102 about their fulcrum and lift the counter-weight 104. Then when the pressure upon the member 100 is relieved the counter-weight acts to restore the member 100 to its normal position. When the member 100 is rocked by the wheel of a vehicle travelling in the direction of the barrier, as indicated by the arrow in Figure 13, a switch conventionally indicated at 105 is operated, and the co-ordinate downward movement of the member 100 also operates another switch 106. The switch 105 is of a type which momentarily closes a contact when engaged by the member 100 and immediately opens after a vehicle has passed over said member, while the switch 106 is of a well-known type in which successive operations thereof by the member 100 are designed to first close and then open a circuit.

The operation of the circuit of Figure 9 will now be described. Let it first be assumed that a coin or token is deposited into the chute 92 of the mechanism 81 before the front wheel of a vehicle 86 has engaged the contact member 100. When the coin is deposited it drops in the chute until stopped by the portion 96 of the detent 94 and in this position bridges the contacts 93 which remain connected until the coin has later been released by the portion 97 of said detent. Engagement of the coin with said contacts 93 closes an obvious circuit for the energization of the relay 107 which remains energized until the coin is completely released by the detent. Then when the front wheel 86 of the vehicle strikes the contact member 100 and rocks and depresses the same the switches 105 and 106 are closed. The closure of the switch 105, which is only momentary and until the wheel of the vehicle passes beyond the member 100, establishes a circuit from battery through said switch, the back contact of relay 108, and the winding thereof to ground. This relay energizes to connect its left-hand front contact to the solenoid 91 but the latter does not operate since its circuit has been previously broken at the back contact of relay 107. When the relay 108 is energized it is also locked by a circuit extending from ground through the winding of the relay, its right-hand front contact and the switch 106 to battery, the latter switch remaining closed until again actuated. The operation of the switch 105 also establishes a circuit extending from battery through said switch, and the winding of the solenoid 95 to ground. This solenoid now energizes and moves the detent 94 from the position shown in Figure 12 to the position in which the portions 96 and 97 are withdrawn from the chute and the portion 98 is projected thereinto. The deposited coin now drops upon the portion 98 and is retained there until the solenoid 95 is de-energized which occurs immediately the switch 105 is opened by the completion of the passage and the front wheel over the member 100, and the de-energization of said solenoid permits the coin to drop onto portion 97. The next step in the sequence of operation is the passage of the rear wheel 87 over the contact member 100, resulting in the second closure of the switch 105 and the opening of switch 106. The latter switch breaks the locking circuit for the relay 108 but this relay is again momentarily re-energized by switch 105. However, the relay immediately releases since its locking circuit is now broken at switch 106 which is now open. The second closure of switch 105 energizes the solenoid 95 which now operates to retract the detent 94, thereby permitting the coin to drop from the portion 97 into the coin box, thus releasing the relay 107. The circuit has now been restored to its normal condition. If, as previously described, a second coin had been deposited in the mechanism 81 before the first coin is released from its position on the portion 97 by the passage of the rear wheel of the vehicle over the contact member 100, said second coin will come to rest upon the portion 96. Then when the first coin is released, the second coin will continue to bridge the contacts 93 to maintain the relay 107 in an energized condition so that the passage of the front wheel of the second vehicle over the contact member 100 will not result in the operation of the barrier.

It will now be assumed that a vehicle attempts to pass the barrier without the deposit of a coin into the mechanism 81. When the front wheel 86 of such vehicle first operates the member 100 the switches 105 and 106 are closed and the relay 107 not having been energized by the deposit of a coin, the previously described energizing and locking circuits for the relay 108 are established through the switches 105 and 106 respectively. The front contacts of the relay 108 now being closed, a circuit is established from battery through the back contact of relay 107, the left-hand front contact of relay 108 and the winding of solenoid 91 to ground. Operation of the solenoid adjusts the barrier 83 to its operative position thus barring passage of the vehicle. With the vehicle brought to a stop in front of the barrier and the front wheel 86 having passed over the member 100, if the driver should now deposit a coin into the mechanism 81 without backing up the vehicle so that the front wheel trips member 100 in the opposite direction, the contacts 93 will be closed by said coin to energize the relay 107 and thus break the circuit for the solenoid 91 so that the barrier 83 will be lowered to its normal position and the vehicle then permitted to pass. The passage of the rear wheel 87 over the member 100 again operates switches 105 and 106. The momentary closure of switch 105 operates the solenoid to drop the coin onto the portion 97 from whence it is released by the next operation of the solenoid. In the event that the driver reverses his vehicle and trips said member 100 in a reverse direction before depositing a coin, as above suggested, the switch 105 will be unaffected but the switch 106 will be opened by the downward movement of said member and the locking circuit for relay 108, thus broken, whereupon said relay releases and the circuit is in normal condition. The driver may now deposit his coin and the operation will proceed as previously described.

With this circuit arrangement, it is possible for a vehicle to pass the barrier in an opposite direction without affecting the same for when the front and rear wheels pass over the member 100 the latter, being rocked in the opposite direction from that previously described, will not operate the switch 105 but will merely be depressed to successively close and open the switch 106 without having any effect upon the circuit.

What is claimed is:

1. In a barrier control system, a barrier movable to open and closed positions, a light sensitive element, two beams of light therefor of different intensities arranged for successive interruption, and means responsive to interruptions of said beams in one order of succession for preventing operation of said barrier and further responsive to interruptions of said beams in a reversal of said order for operating the barrier.

2. In a barrier control system, a barrier having a normally open position, means to close said barrier, a light sensitive element, two beams of light therefor of different intensities arranged for successive interruption, and means responsive to an interruption of one of said beams for operating said closing means and further responsive to interruptions of said beams in a certain order of succession for rendering said closing means inoperative.

3. In a barrier control system, a barrier movable to open and closed positions, a light sensitive element, beams of light therefor of different intensities, and means responsive to interruption of said beams and controlled by the order of succession of such interruptions for determining the position of said barrier relative to the passageway which it controls.

4. In a barrier control system, a barrier movable to open and closed positions, a light sensitive element, two beams of light therefor of different intensities arranged for successive interruption, means responsive to interruptions of said beams in one order of succession for preventing operation of said barrier and further responsive to interruptions of said beams in a reversal of said order for operating the barrier, a signal, and means to operate said signal should pressure be applied against said barrier after it has been operated.

5. In a barrier control system, a barrier having a normally open position, a road contact member having coordinate movements when pressure is exerted thereon by an object passing thereover, counter-balancing means for said contact member, an electromagnetic device for closing said barrier, means responsive to one of the movements of said contact member to energize said device, and means responsive to another movement of said contact member to maintain said device energized.

6. In a barrier control system in which legal passage of the barrier is effected by the deposit of a coin or token, the combination of a passageway, a barrier therein having a normally open position, means to close said barrier, and operating means for said closing means located at such height relative to the bottom of said passageway that it will be responsive to the passage thereof by some portion of a person or other object extending at least as high as said means to operate said closing means should said passage be attempted without the deposit of a coin.

7. In a barrier control system in which legal passage of the barrier is effected by the deposit of a coin or token, the combination of a barrier having a normally open position, means to close said barrier, a light sensitive element, a beam therefor, means responsive to the deposit of a coin and subsequent interruption of said beam to prevent operation of said closing means, and other means operable upon failure to deposit a coin and subsequent interruption of said beam to operate said closing means.

8. In a barrier control system in which legal passage of the barrier is effected by the deposit of a coin or token, the combination of a barrier having a normally open position, means to close said barrier, operating means for said closing means located at such height relative to the bottom of said passageway that it will be responsive to the passage thereof by some portion of a person or other object extending at least as high as said means to operate said closing means should said passage be attempted without the deposit of a coin, and means operated by pressure against said barrier to lock the same in its closed position.

9. In a barrier control system in which legal passage of the barrier is effected by the deposit of a coin or token, the combination of a barrier having a normally open position, means to close said barrier, a light sensitive element, a beam therefor, means responsive to the deposit of a coin and subsequent interruption of said beam to prevent operation of said closing means, other means operable upon failure to deposit a coin and subsequent interruption of said beam to operate said closing means, and means operated by pressure against said barrier to lock the same in its closed position.

10. In a barrier control system in which legal passage of the barrier is effected by the deposit of a coin or token, the combination of a barrier having a normally open position, means to close said barrier, operating means for said closing means located at such height relative to the bottom of said passageway that it will be responsive to the passage thereof by some portion of a person or other object extending at least as high as said means to operate said closing means should said passage be attempted without the deposit of a coin, a signal, and means to operate said signal, said pressure being exerted against said barrier after it has been closed.

11. In a barrier control system in which legal passage of the barrier is effected by the deposit of a coin or token, the combination of a barrier having a normally open position, means to close said barrier, operating means for said closing means located at such height relative to the bottom of said passageway that it will be responsive to the passage thereof by some portion of a person or other object extending at least as high as said means to operate said closing means should said passage be attempted without the deposit of a coin, a signal, a lock for said barrier, and means to operate said signal and lock should pressure be exerted against said barrier in the direction of its opening movement.

12. In a barrier control system in which legal passage of the barrier is effected by the deposit of a coin or token, the combination of a barrier having a normally open position, means to close said barrier, a light sensitive element, a beam therefor, means responsive to the deposit of a coin and subsequent interruption of said beam to prevent operation of said closing means, other means operable upon failure to deposit a coin and subsequent interruption of said beam to operate said closing means, means operated by pressure against said barrier to lock the same in its closed position, a signal, and means to operate said signal should pressure be exerted against said barrier in the direction of its opening movement.

13. In a barrier control system in which legal passage of the barrier is effected by the deposit of a coin or token, the combination of a barrier having a normally open position, light sensitive means, two beams of light therefor on opposite sides of said barrier, means operable upon failure to deposit a coin and subsequent interruption of either of said beams to close said barrier, and means operated by the deposit of a coin and subsequent interruption of one of said beams to render said closing means inoperative until both beams have been interrupted following the deposit of said coin.

14. In a barrier control system in which legal passage of the barrier is effected by the deposit of a coin or token, the combination of a barrier, light sensitive means, two beams of light therefor, means operable upon failure to deposit a coin and an interruption of either of said beams to bar passage of said barrier, and means operated by the deposit of a coin and subsequent interruption of one of said beams to render said barrier ineffective until both beams have been interrupted following the deposit of said coin.

15. In a barrier control system in which legal passage is effected by the deposit of a coin or token, the combination of a barrier, light sensitive means, two beams of light therefor, means operable upon failure to deposit a coin and an interruption of either of said beams to bar passage of said barrier, means operated by pressure against said barrier in the direction of its opening movement to lock the same against opening, and means operated by the deposit of a coin and subsequent interruption of one of said beams to render said barrier ineffective until both beams have been interrupted following the deposit of said coin.

ANDREW J. DUANY.
HENRY THOMAS RANDALL.